(12) United States Patent
Asou et al.

(10) Patent No.: US 7,223,296 B2
(45) Date of Patent: May 29, 2007

(54) HYDROGEN GENERATION SYSTEM AND FUEL CELL SYSTEM HAVING THE SAME

(75) Inventors: Tomonori Asou, Kitakatsuragi-gun (JP); Akira Maenishi, Ikeda (JP); Yutaka Yoshida, Nabari (JP); Kunihiro Ukai, Ikoma (JP); Yuji Mukai, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 382 days.

(21) Appl. No.: 10/326,285

(22) Filed: Dec. 23, 2002

(65) Prior Publication Data

US 2004/0043262 A1    Mar. 4, 2004

(30) Foreign Application Priority Data

Dec. 25, 2001    (JP)    ............... 2001-391330

(51) Int. Cl.
  $B01J\ 7/00$    (2006.01)
  $B01J\ 19/00$    (2006.01)
  $B01J\ 8/00$    (2006.01)
  $C10J\ 3/20$    (2006.01)

(52) U.S. Cl. ............... 48/61; 48/116; 48/75; 48/127.9; 422/198; 422/312; 201/2.5; 165/911

(58) Field of Classification Search .............. 48/116; 431/268
  See application file for complete search history.

(56) References Cited

U.S. PATENT DOCUMENTS

2002/0007595 A1*    1/2002    Maier-Roeltgen et al. .... 48/116

2002/0042035 A1*    4/2002    Komiya et al. ............. 431/268

FOREIGN PATENT DOCUMENTS

| JP | 62070202 | 3/1987 |
|---|---|---|
| JP | 01157402 | 6/1989 |
| JP | 10167701 | 6/1998 |
| JP | 2000 281311 | 10/2000 |
| JP | 2000 281313 | 10/2000 |

* cited by examiner

Primary Examiner—Glenn Caldarola
Assistant Examiner—Kaity Handal
(74) Attorney, Agent, or Firm—Stevens, Davis, Miller & Mosher, LLP (57) ABSTRACT

A hydrogen generation system may include a burner unit that generates combustion gas and a combustion gas passage through which the combustion gas generated by the burner unit flows. A reformer, having a reforming catalyst, generates a reformed gas containing hydrogen by steam reforming a feed material and steam using the heat from the combustion gas. An evaporator evaporates water into steam using the heat from the combustion gas, flowing through the combustion gas passage, and supplies the steam to the reformer. The combustion gas passage is arranged to cover at least a portion of an outer surface of the reformer, and the evaporator is arranged to cover at least a portion of an outer surface of the combustion gas passage.

11 Claims, 5 Drawing Sheets

HYDROGEN GENERATION SYSTEM AND FUEL CELL SYSTEM HAVING THE SAME

BACKGROUND OF THE INVENTION

1. Field of the Invention

The present invention relates to a hydrogen generation system that is used to produce a hydrogen-rich reformed gas to be supplied to a fuel cell, and a fuel cell system having such a hydrogen generation system.

2. Related Art

Figure 5:
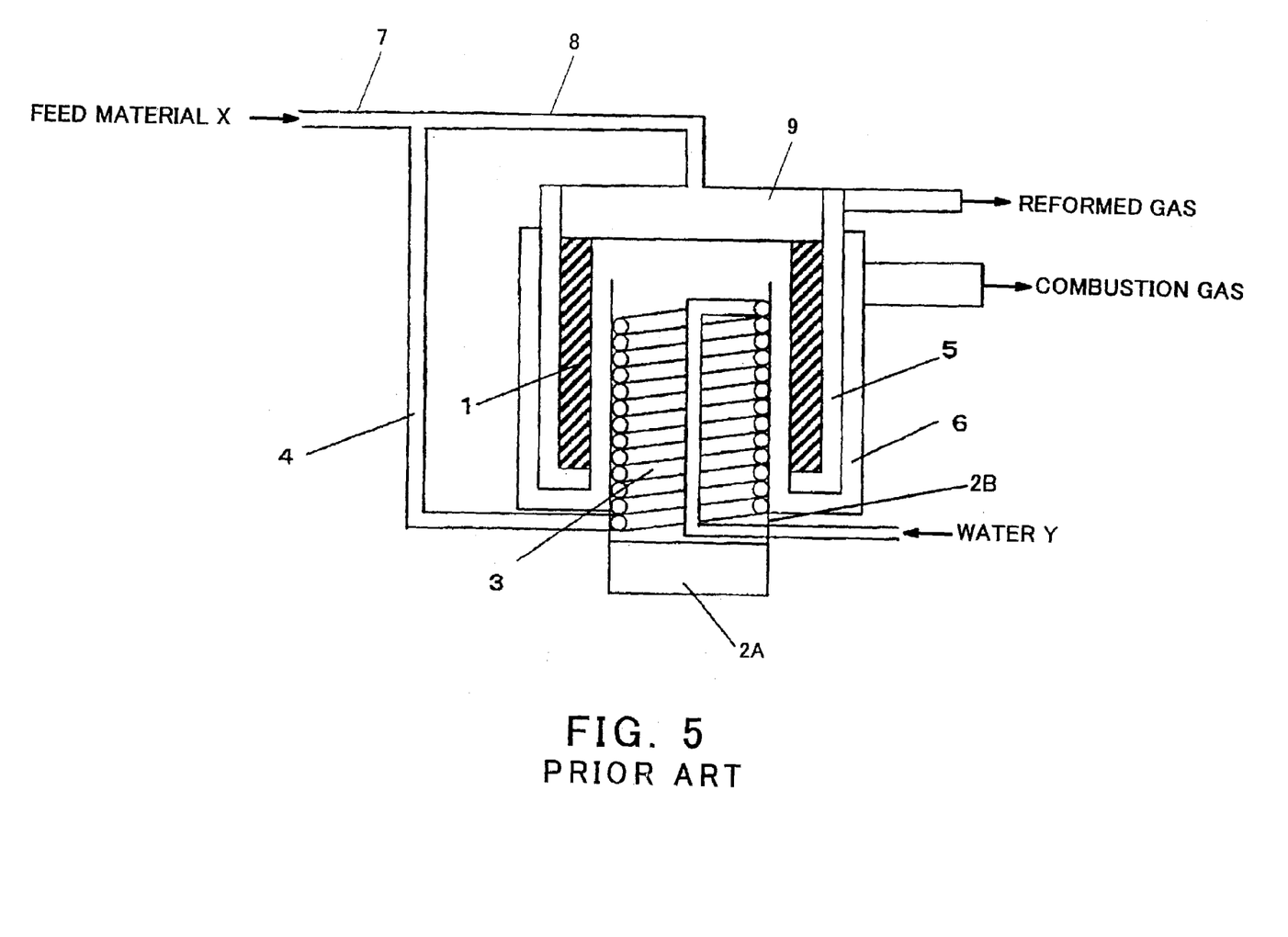
FIG. 5 is a cross-sectional view that schematically shows a configuration of a conventional hydrogen generation system.

Fuel cells require a supply of a hydrogen-rich gas to produce electricity. One conventional example of a hydrogen generation system that generates gas for such purposes includes a coiled tubing evaporator in a descending spiral where steam is generated for reformation (see, for example, Japanese Patent Laid-Open No. 2000-281311). FIG. 5 is a cross-sectional view which schematically shows a configuration of this conventional hydrogen generation system. As shown in FIG. 5, the conventional hydrogen generation system comprises a hollow cylindrical reformer 1 and a burner 2A. The reformer 1 is filled with catalyst particles or pellets. The burner 2 functions as a burning unit to heat the reformer 1. The above-mentioned coiled tubing 3 is placed inside a combustion cylinder 2B that is arranged within the reformer 1 over the burner 2A. The outlet end of the coiled tubing 3 is connected to a steam supply tubing 4. The steam supply tubing 4 is connected to a feed supply tubing 7 which becomes a mixed gas flow tubing 8. The mixed gas flow tubing 8 is connected to a mixed gas chamber 9 that is disposed over the combustion cylinder 2B. A reformed gas passage 5 is fitted around the reformer 1 for the flowing of the reformed gas. A combustion gas passage 6 is fitted around the reformed gas passage 5.

In the conventional hydrogen generation system having the above-mentioned configuration, water Y for the reforming process flows into the hydrogen generation system through the upper portion of the coiled tubing 3 and is heated by combustion gas when it runs through the tubing. The heated water is converted into a gas-liquid two-phase flow state and then into steam. The steam is fed to the steam supply tubing 4. The steam that is supplied to the steam supply tubing 4 is mixed with a feed material X flowing through the feed supply tubing 7. The mixture is then supplied to the mixed gas chamber 9 via the mixed gas flow tubing 8. The steam and the feed material X in the mixed gas chamber 9 are then supplied to the reformer 1 where they are reformed into a reformed gas by steam reformation. The reformed gas is exhausted to the outside through the reformed gas passage 5. The combustion gas generated by the burner 2A is used to heat the coiled tubing 3 and the reformer 1 and is then exhausted to the outside through the combustion gas passage 6.

However, the above-mentioned conventional hydrogen generation system has the problem of significant release of heat to the surrounding due to the outermost placement of the combustion gas passage 6, lowering the thermal efficiency of the system.

Furthermore, the steam generated in the coiled tubing 3 flows through the steam supply tubing 4 which runs inside the system to the reformer 1. The steam supply tubing 4 dissipates a large amount of heat, which further lowers the thermal efficiency.

In addition, the hot combustion gas heats the coiled tubing 3. This tends to cause a so-called "dried out" state under which no water is present within the coiled tubing 3, with the possibility of ebullition that causes intermittent evaporation. The steam expands rapidly through change of state from a liquid to a vapor. This suddenly increases resistance in the tubing. If water comes to ebullition again and again, the supply pressure of the water Y fluctuates greatly. This results in fluctuation in supply amount of the water Y and, in turn, fluctuation in supply amount of steam. The fluctuation in amount of steam for the catalysis in the reformer 1 exhibits problems with a higher tendency to cause fluctuation in the level of carbon monoxide (CO) in the reformed gas. Varying flow rate of steam causes fluctuation in supply pressure of the feed material X because the steam flowing through the steam supply tubing 4 is mixed with the feed material X and is then supplied to the reformer 1. This fluctuates the flow rate of the feed material X, varying the flow rate of the reformed gas to the fuel cell. Such variation results in unstable power generation in the fuel cell.

The present invention was made with respect to the above-mentioned circumstances, and an object thereof is to provide a hydrogen generation system with which thermal efficiency increases, the CO level in the reformed gas stabilizes, and a fixed supply amount of the reformed gas can be achieved.

SUMMARY OF THE INVENTION

In order to solve the above-mentioned problems, a hydrogen generation system according to the present invention comprises a burner unit that generates combustion gas; a combustion gas passage through which the combustion gas generated by said burner unit flows; a reformer for generating a reformed gas that contains hydrogen by steam reforming from a feed material and steam using the heat from the combustion gas, the feed material containing a compound made up of at least carbon and hydrogen; and an evaporator for evaporating water from outside into steam using the heat from the combustion gas flowing through said combustion gas passage, to supply the steam to said reformer, wherein said combustion gas passage is arranged to cover at least a portion of an outer surface of said reformer, and said evaporator is arranged to cover at least a portion of an outer surface of said combustion gas passage.

Thus, the reformer that undergoes the highest temperature is placed on the inner side and the evaporator that undergoes the lowest temperature is placed on the outer side. The thermal efficiency can be increased as compared with conventional systems.

In the hydrogen generation system according to the above-mentioned invention, it is preferable that said evaporator includes a first evaporator section having an inlet for water or steam, and a second evaporator section having an outlet for steam, the second evaporator section being disposed inside the first evaporator section and disposed outside said combustion gas passage, the first evaporator section and the second evaporator section being separated from each other with a wall, the wall having at least one opening formed therein.

As apparent from the above, the first evaporation section is placed outside the second evaporation section where overheated steam is produced. Water, which is a liquid, and saturated steam flow through the first evaporation section. The outside temperature of the first evaporation section is about 100° C. or lower. This reduces the amount of heat released to the surrounding, further increasing the thermal efficiency.

The steam produced in the first evaporation section passes through the opening and travels rapidly to the second evaporation section. As a result, the increase in pressure is much smaller that occurs during expansion of the steam in the first evaporation section. The supply pressure of water fluctuates less, allowing a constant feed of the steam to the reformer. Accordingly, a stable catalytic reaction occurs, stabilizing the CO level in the reformed gas and the amount of hydrogen produced.

In the hydrogen generation system according to the above-mentioned invention, it is preferable that said evaporator has a hollow cylindrical space enclosed by an outer cylinder and an inner cylinder, the first evaporator section and the second evaporator section being formed by placing a cylindrical wall in the hollow cylindrical space.

Furthermore, in the hydrogen generation system according to the above-mentioned invention, it is preferable that the first evaporation section has a flow passage restrictor along the periphery thereof, the flow passage restrictor defining the flow passage for water or steam. In such a case, it is preferable that the flow passage restrictor defines a helical flow passage for water or steam.

This configuration improves water evaporation capacity, increasing the amount of steam available for steam reformation. Accordingly, a higher feed conversion rate can be achieved to increase the amount of hydrogen.

Furthermore, in the hydrogen generation system according to the above-mentioned invention, it is preferable that the first evaporator section has an inlet for the feed material.

Moreover, in the hydrogen generation system according to the above-mentioned invention, it is preferable that a temperature sensor unit is provided in the vicinity of the lower end of said evaporator.

Moreover, in the hydrogen generation system according to the above-mentioned invention, it is preferable that the hydrogen generation system is configured to allow heat exchange between the steam and the combustion gas in a path from an outlet of the steam formed in the second evaporation section to said reformer.

In addition, in the hydrogen generation system according to the above-mentioned invention, it is preferable that a combustion gas passage is disposed outside the first evaporation section.

Furthermore, it is preferable that the hydrogen generation system according to the above-mentioned invention further comprises a water preheating unit for heating water or steam to be supplied to the first evaporation section, using the combustion gas.

A fuel cell system according to the present invention comprises a hydrogen generation system according to claim 1; and a fuel cell that generates power by combining oxidation gas reacting oxygen with reformed gas supplied from said hydrogen generation system. Thus, the amount of power generation in a fuel cell can be stabilized.

This object, as well as other objects, features and advantages of the present invention will become more apparent to those skilled in the art from the following description taken with reference to the accompanying drawings.

DETAILED DESCRIPTION OF THE PREFERRED EMBODIMENTS

Specific embodiments of the present invention are described below with reference to the drawings.

(First Embodiment)

Figure 1:
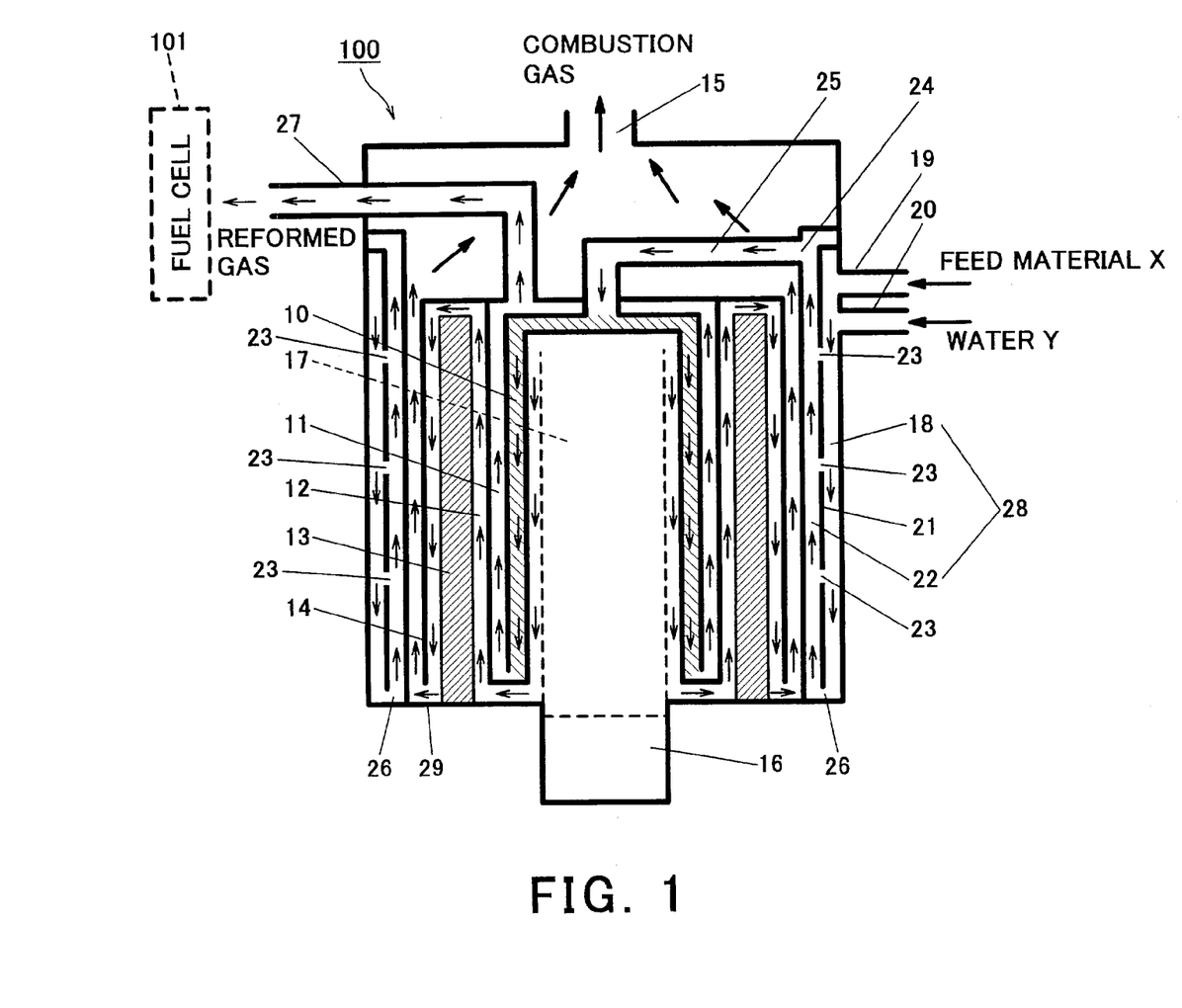
FIG. 1 is a cross-sectional view that schematically shows a configuration of a hydrogen generation system according to a first embodiment of the present invention.

FIG. 1 is a cross-sectional view that schematically shows a configuration of a hydrogen generation system according to a first embodiment of the present invention. As shown in FIG. 1, a hydrogen generation system 100 according to this embodiment comprises a burner 16 that generates combustion gas and a cylindrical combustion chamber 17 that is placed above the burner 16. A hollow cylindrical reformer 10 is coaxially fitted around the combustion chamber 17. The reformer 10 contains a catalyst bed filled with steam reforming catalyst. Feed gas is steam reformed in the catalyst bed to generate reformed gas.

A fuel cell 101 is disposed outside of the hydrogen generation system 100. The hydrogen generation system 100 and the fuel cell 101 forms the fuel cell system according to the present invention. The reformed gas generated in the reformer 10 is exhausted through a reformed gas discharge port 27 and is supplied to the fuel cell 101.

A hollow cylindrical reformed gas passage 11 and a hollow cylindrical combustion gas passage 12 are coaxial with the combustion chamber 17. The reformed gas passage 11 is fitted around the reformer 10 to introduce the reformed gas generated in the reformer 10 to the reformed gas discharge port 27. The combustion gas passage 12 is fitted around the reformed gas passage 11 and the combustion gas generated by the burner 16 flows through the combustion gas passage 12. The combustion gas passage 12 comprises a flow passage defined by a hollow cylindrical heat insulating material 13 and a hollow cylindrical body 14 to guide the combustion gas to a combustion gas discharge port 15.

Furthermore, a hollow cylindrical evaporator 28 is fitted around the combustion gas passage 12 as the outermost component of the hydrogen generation system 100. The hollow cylindrical evaporator 28 is coaxial with the combustion chamber 17. The evaporator 28 is made up of a first hollow cylindrical evaporator section 18 and a second hollow cylindrical evaporator section 22 that is separated from the first evaporation section 18 by a hollow cylindrical partition wall 21. The second evaporator section 22 is placed on the side of the combustion gas passage 12. The first evaporator section 18 is placed on the outside of the second evaporator section 22 through the partition wall 21, as the outermost component of the hydrogen generation system 100. A feed inlet 19 and a water inlet 20 are provided in the upper part of the first evaporator section 18. The feed inlet 19 is for supplying, to the system, a feed material X that contains a compound made up of at least carbon and hydrogen. The water inlet 20 is for supplying water Y to the system. Examples of the compound that is made up of at least carbon and hydrogen include hydrocarbons such as methane, ethane, and propane, utility gas, natural gas, alcohols such as methanol, kerosene, and LPG (liquefied petroleum gas). A steam outlet 24 is provided in the upper part of the second evaporator section 22 to discharge the steam generated in the evaporator 28. The steam outlet 24 is connected to the reformer 10 via a water vapor supply tubing 25. Thus, the steam that exits the steam outlet 24 is supplied to the reformer 10 through the water vapor supply tubing 25.

The first evaporator section 18 communicate with the second evaporator section 22 via a plurality of openings 23 formed in the partition wall 21 and a communication section 26. This configuration is described in detail with reference to FIG. 2.

Figure 2:
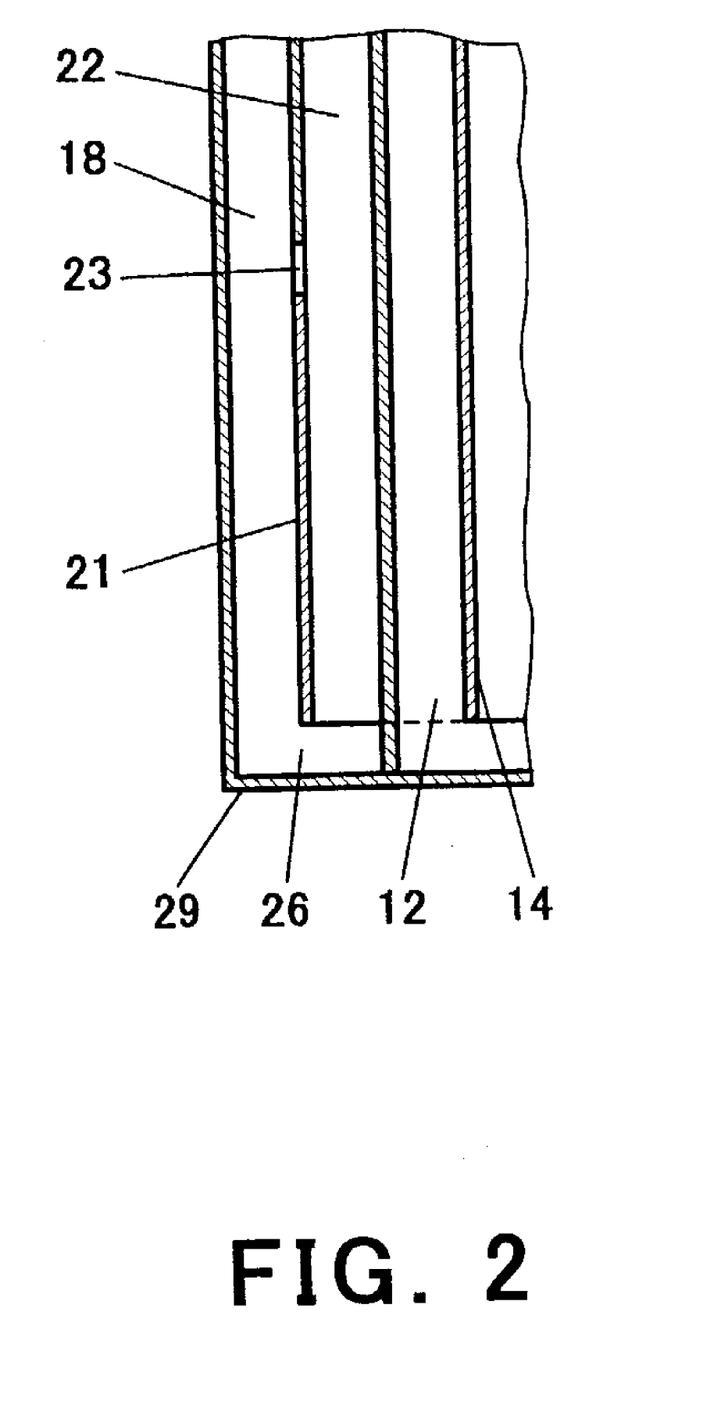
FIG. 2 is a broken cross-sectional view showing a configuration of the hydrogen generation system in FIG. 1 at and around the lower left end thereof.

FIG. 2 is a broken cross-sectional view showing a configuration of the hydrogen generation system 100 in FIG. 1 at and around the lower left end of it. As shown in FIG. 2, the partition wall 21 does not extend to the bottom wall 29 of the hydrogen generation system 100. A gap of a predetermined width is circumferentially formed between the lower end of the partition wall 21 and the bottom wall 29. The gap serves as the communication section 26 that communicates between the first evaporator section 18 and the second evaporator section 22. The openings 23 are formed in the partition wall 21 at appropriate positions. The shape of the opening 23 is not limited to a particular shape. The opening 23 may have any one of suitable shapes such as a circle, an ellipse, an oval, and a rectangle.

Next, operations of the hydrogen generation system 100 that is configured according to this embodiment are described.

The combustion gas generated by the burner 16 passes through the combustion gas passage 12 while heating the reformer 10, the reformed gas passage 11, and the second evaporator section 22 in this order. The combusted gas is then exhausted to the outside through the combustion gas discharge port 15. The water Y that is used for steam reformation in the reformer 10 is fed from the outside through the water inlet 20. The water Y travels downward in the first evaporator section 18. The heat from the combustion gas flowing through the combustion gas passage 12 evaporates the water Y into steam. The water Y is evaporated by the used of the heat from the combustion gas. Thus, it is necessary to increase the amount of heat transfer from the combustion gas in order to ensure the evaporation. In order to increase the amount of heat transfer from the combustion gas, the time required for the water Y to pass through the first evaporator section 18 maybe increased. To this end, it is desirable that the water inlet 20 is placed as high as possible in the first evaporator section 18.

The steam produced by the first evaporator section 18 moves to the second evaporator section 22 through the openings 23 formed in the partition wall 21. The portion of the water Y that is not evaporated in the first evaporator section 18 is collected at the lower end of the first evaporator section 18 and is also collected at the lower end of the second evaporator section 22 after being passed through the communication section 26. As shown in FIG. 1, the combustion gas flows from the bottom to the top of the second evaporator section 22. This facilitates the heat transfer to the water Y collected at the lower ends of the first evaporator section 18 and the second evaporator section 22. The temperature on the outer surface of the hydrogen generation system 100 is about 100° C. or lower because the first evaporator section 18 contains water in a liquid phase and saturated steam. Thus, less heat is released to the surrounding. This increases the thermal efficiency of the hydrogen generation system 100. The openings 23 facilitate rapid movement of the steam produced in the first evaporator section 18, into the second evaporator section 22. Increase in pressure in the first evaporator section 18 by the increase in volume of the steam produced can be reduced. As a result, the supply pressure of the water Y fluctuates less, and a constant amount of steam can be supplied from the steam outlet 24 to the reformer 10. The catalytic reaction in the reformer 10 becomes steady. The fluctuation of the CO level in the reformed gas becomes small.

The feed material X is supplied from the outside through the feed inlet 19. It passes through the first evaporator section 18 and the second evaporator section 22 and flows into the reformer 10 through the water vapor supply tubing 25. With this configuration, a hydrogen-rich reformed gas is produced by steam reformation using the reforming catalyst in the reformer 10. Steam reformation is a heat-absorbing (endothermic) process that occurs at a high temperature of about 700° C. Therefore, steam reformation requires a supply of additional heat from the combustion gas in this case. The reformed gas thus generated flows through the reformed gas passage 11 and is exhausted through the reformed gas discharge port 27 to the fuel cell 101.

The feed material X is preheated by the heat transfer from the combustion gas when it passes through the first evaporator section 18 and the second evaporator section 22. This increases the thermal efficiency of the hydrogen generation system 100. Fins may be provided in the first evaporator section 18, somewhere on the side of first evaporator section 18 in the second evaporator section 22, and somewhere on the side of the combustion gas passage 12 in the second evaporator section 22 in order to increase a surface area available for the heat transfer. The fins increase the amount of water Y to be evaporated.

(Second Embodiment)

Figure 3:
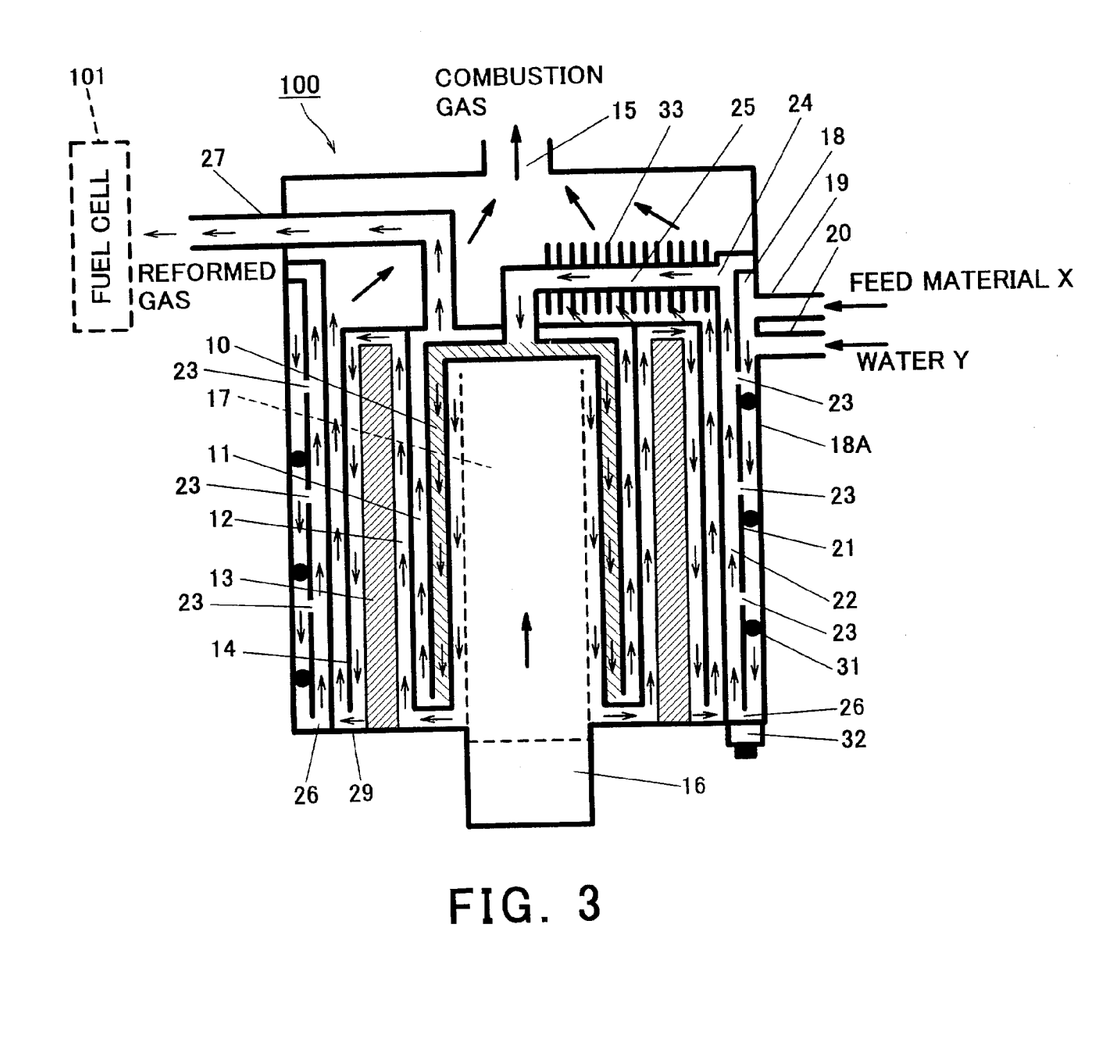
FIG. 3 is a cross-sectional view that schematically shows a configuration of a hydrogen generation system according to a second embodiment of the present invention.

FIG. 3 is a cross-sectional view that schematically shows a configuration of a hydrogen generation system 100 according to a second embodiment of the present invention. As shown in FIG. 3, a round bar which serves as a flow passage restrictor is wound spirally in the hollow cylindrical first evaporator section 18. The round bar forms a helical flow passage 18A in the first evaporator section 18. Temperature sensing means 32 is provided below the first evaporator section 18 and the second evaporator section 22. The temperature sensing means 32 is formed of a temperature sensor for measuring temperature at the bottom of the first evaporator section 18 and the second evaporator section 22. A heat exchanger 33 is provided around the water vapor supply tubing 25.

Other components and parts of the hydrogen generation system 100 according to this embodiment are similar to those described in conjunction with the first embodiment. Accordingly, such components and parts are depicted similar reference numerals and description thereof will be omitted.

Next, operations of the hydrogen generation system 100 that is configured according to this embodiment are described.

The water Y supplied from the outside through the water inlet 20 moves downward along the round bar in the helical flow passage 18A. The movement of the water Y along the spirally wound round bar 31 increases the resident time of the water Y in the first evaporator section 18. In addition, the water Y is distributed uniformly in the peripheral direction. This increases the amount of heat transfer from the combustion gas, increasing the amount of steam available for steam reformation. Accordingly, a higher conversion rate of the feed material X can be achieved to increase the amount of hydrogen in the reformed gas.

In order to allow the water Y to stay in the first evaporator section 18 as long as possible, and to provide a uniform distribution of the resident water Y in the peripheral direction, such a configuration is suitable that can avoid the falling of the water Y to the bottom of the first evaporator section just after the supply to it. This means that the flow passage 18A is not limited to a helical one. What is required is a flow passage restrictor is provided to move water or steam in at least the peripheral direction.

The heat exchanger 33 exchanges heat between the steam flowing through the water vapor supply tubing 25 and the combustion gas. The heat of the combustion gas is collected to further increase the thermal efficiency of the hydrogen generation system 100.

The temperature sensing means 32 measures the temperature of the first evaporator section 18 and the second evaporator section 22 at the bottom of them. The measured temperature may be used as an indicator to determine whether the water Y is in the bottom of the first evaporator section 18 and/or of the second evaporator section 22 or the water is dried out. For example, when the measured temperature is lower than a predetermined temperature, it can be expected that the water Y is present at the bottom of the first evaporator section 18 and the second evaporator section 22. In response to this determination result, the supply amount of the water Y is decreased to ensure the evaporation in the first evaporator section 18 and the second evaporator section 22.

A helical flow passage similar to the helical flow passage 18A may also be provided in the second evaporator section 22. In such a case, the steam flowing through the second evaporator section 22 resides therein for a longer period of time. The temperature of the steam rises accordingly.

The helical flow passage 18A may be formed by providing a spiral rib on the partition wall 21 instead of the round bar 31.

(Third Embodiment)

Figure 4:
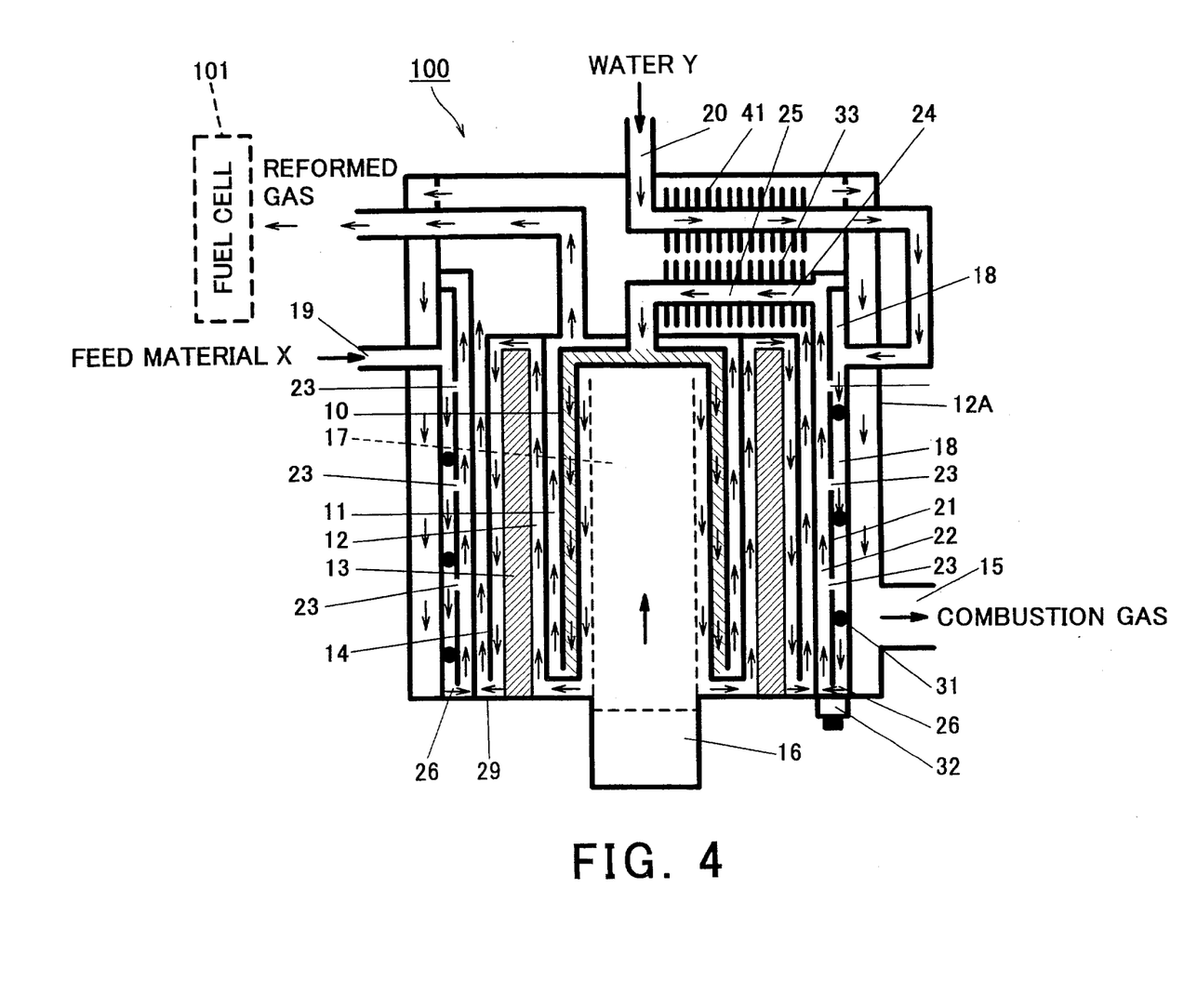
FIG. 4 is a cross-sectional view that schematically shows a configuration of a hydrogen generation system according to a third embodiment of the present invention.

FIG. 4 is a cross-sectional view that schematically shows a configuration of a hydrogen generation system according to a third embodiment of the present invention. As shown in FIG. 4, a hollow cylindrical combustion gas passage 12A is fitted around a first evaporator section 18. The combustion gas passage 12A is coaxial with the first evaporator section 18. A combustion gas discharge port 15 is formed at a lower portion of the combustion gas passage 12A. A water preheating section 41 is arranged in an upper portion of the hydrogen generation system 100 to heat the water Y fed to the first evaporator section 18, by using the combustion gas.

Other components and parts of the hydrogen generation system 100 according to this embodiment are similar to those described in conjunction with the second embodiment. Accordingly, such components and parts are depicted similar reference numerals and description thereof will be omitted.

Next, operations of the hydrogen generation system 100 that is configured according to this embodiment are described.

The combustion gas flowing along the second evaporator section 22 flows near the water preheating section 41 that is provided on the downstream side. The combustion gas then passes through the combustion gas passage 12A that is fitted around the first evaporator section 18 and exits the combustion gas passage 12A through the combustion gas discharge port 15. The water Y supplied to the water preheating section 41 is preheated by the heat transfer from the combustion gas, increasing the thermal efficiency. The combustion gas flows through the combustion gas passage 12A, so that the evaporation capacity is increased significantly because of the heat transfer from the combustion gas to the first evaporator section 18. The temperature of the combustion gas that leaves the combustion gas discharge port 15 can be decreased, which increases the thermal efficiency further.

Two or more of the above-mentioned embodiments may be combined to provide various hydrogen generation systems depending on, for example, the applications and usage of a fuel cell system having a hydrogen generation system according to the present invention.

Numerous modifications and alternative embodiments of the invention will be apparent to those skilled in the art in view of the forgoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A hydrogen generation system comprising:
   a burner unit that generates combustion gas;
   a tubular combustion gas passage through which the combustion gas generated by said burner unit flows;
   a tubular reformer having a reforming catalyst for generating a reformed gas that contains hydrogen by steam reforming from a feed material and steam using the heat from the combustion gas, the feed material containing a compound made up of at least carbon and hydrogen; and
   an evaporator for evaporating water from outside into steam using the heat from the combustion gas flowing through said tubular combustion gas passage, to supply the steam to said reformer, wherein:
   said tubular combustion gas passage is arranged to cover at least a portion of an outer surface of said reformer,
   said evaporator is arranged to cover at least a part of an outer peripheral side of a tubular portion of said tubular combustion gas passage, and
   said tubular combustion gas passage and said evaporator extend in parallel with a center axis of said reformer.

2. The hydrogen generation system as claimed in claim 1, wherein said evaporator includes a first evaporator section having an inlet for water or steam, and a second evaporator section having an outlet for steam, the second evaporator section being disposed inside the first evaporator section and disposed outside said combustion gas passage, the first evaporator section and the second evaporator section being separated from each other with a wall, the wall having at least one opening formed therein.

3. The hydrogen generation system as claimed in claim 2, wherein said evaporator has a hollow cylindrical space enclosed by an outer cylinder and an inner cylinder, the first evaporator section and the second evaporator section being formed by placing a cylindrical wall in the hollow cylindrical space.

4. The hydrogen generation system as claimed in claim 3, wherein the first evaporation section has a flow passage restrictor along the periphery thereof, the flow passage restrictor defining the flow passage for water or steam.

5. The hydrogen generation system as claimed in claim 4, wherein the flow passage restrictor defines a helical path for water or steam.

6. The hydrogen generation system as claimed in claim 2, wherein the first evaporator section has an inlet for the feed material.

7. The hydrogen generation system as claimed in claim 2, wherein a temperature sensor unit is provided in the vicinity of the lower end of said evaporator.

8. The hydrogen generation system as claimed in claim 2, configured to allow heat exchange between the steam and the combustion gas in a path from an outlet of the steam formed in the second evaporation section to said reformer.

9. The hydrogen generation system as claimed in claim 2, wherein a combustion gas passage is disposed outside the first evaporation section.

10. The hydrogen generation system as claimed in claim 2, further comprising a water preheating unit for heating water or steam to be supplied to the first evaporation section, using the combustion gas.

11. A fuel cell system comprising:
a hydrogen generation system according to claim 1; and
a fuel cell that generates power by reacting oxidation gas containing oxygen with reformed gas supplied from said hydrogen generation system.

* * * * *